United States Patent
Lüchinger

(10) Patent No.: US 8,281,959 B2
(45) Date of Patent: Oct. 9, 2012

(54) DOSAGE-DISPENSING DEVICE FOR POWDERS AND PASTES

(75) Inventor: Paul Lüchinger, Uster (CH)

(73) Assignee: Mettler-Toledo AG, Greifensee (CH)

(*) Notice: Subject to any disclaimer, the term of this patent is extended or adjusted under 35 U.S.C. 154(b) by 314 days.

(21) Appl. No.: 12/851,762

(22) Filed: Aug. 6, 2010

(65) Prior Publication Data

US 2011/0036870 A1 Feb. 17, 2011

Related U.S. Application Data

(63) Continuation of application No. PCT/EP2008/063267, filed on Oct. 3, 2008.

(30) Foreign Application Priority Data

Feb. 11, 2008 (EP) ..................................... 08151259

(51) Int. Cl.
  *G01F 3/08* (2006.01)
  *G01F 1/10* (2006.01)
  *B65D 47/44* (2006.01)

(52) U.S. Cl. ........ 222/235; 222/544; 222/412; 222/241; 222/490

(58) Field of Classification Search .......... 222/411–413, 222/229, 233–236, 239–242, 505, 507, 510, 222/544, 559

See application file for complete search history.

(56) References Cited

U.S. PATENT DOCUMENTS

| | | | |
|---|---|---|---|
| 2,699,272 A * | 1/1955 | Barth | 222/413 |
| 2,857,080 A | 10/1958 | Elias | |
| 3,047,034 A * | 7/1962 | Sassmannshausen et al. | 141/311 R |
| 3,191,642 A | 6/1965 | Saito | |
| 3,241,727 A | 3/1966 | Heckman | |
| 3,621,876 A * | 11/1971 | Campbell | 137/846 |
| 4,767,026 A * | 8/1988 | Keller et al. | 222/137 |
| 5,145,009 A * | 9/1992 | Mheidle et al. | 141/83 |
| 5,228,604 A * | 7/1993 | Zanini et al. | 222/504 |
| 5,495,323 A * | 2/1996 | Meetze, Jr. | 399/120 |
| 6,021,821 A * | 2/2000 | Wegman | 141/93 |
| 6,070,763 A | 6/2000 | Gueret | |
| 7,036,538 B2 * | 5/2006 | Schlosser | 141/260 |
| 7,836,922 B2 * | 11/2010 | Poole et al. | 141/72 |
| 7,922,044 B2 * | 4/2011 | Luchinger | 222/344 |
| 2002/0017536 A1 | 2/2002 | Bonningue | |

FOREIGN PATENT DOCUMENTS

| | | |
|---|---|---|
| DE | 10243007 A1 | 3/2004 |
| EP | 0572976 B1 | 4/1997 |
| GB | 140550 | 4/1920 |

* cited by examiner

*Primary Examiner* — Kevin P Shaver
*Assistant Examiner* — Charles P Cheyney
(74) *Attorney, Agent, or Firm* — Standley Law Group LLP

(57) ABSTRACT

A dosage-dispensing device, which can be used for dosage materials in the form of powders or pastes, includes a housing with at least one receptacle compartment formed inside the housing for the purpose of holding the dosage material. The dosage-dispensing device further includes at least one dispensing head that comprises an elastic material and has an outlet for the dosage material. In the non-stressed condition, i.e. when there is no mechanical force or pressure acting on it, the outlet is tightly closed against the outside. When a force or pressure is applied, the outlet opens up, with the aperture width being variable, dependent on the applied force. Furthermore, inside the receptacle compartment and/or the dispensing head, there is at least one mechanical actuator element arranged through which the outlet can be opened.

19 Claims, 4 Drawing Sheets

DOSAGE-DISPENSING DEVICE FOR POWDERS AND PASTES

CROSS-REFERENCE TO RELATED APPLICATIONS

This application is a continuation under 35 USC §120 of PCT/EP2008/063267, filed 3 Oct. 2008 which is, in turn, entitled to benefit of a right of priority under 35 USC §119 from European patent application 08151259.2, filed 11 Feb. 2008. The content of each of these applications is incorporated by reference as if fully recited herein.

TECHNICAL FIELD

The present invention concerns a dosage-dispensing device for substances of a pulverous or pasty consistency.

BACKGROUND OF THE ART

Dosage-dispensing devices of this kind are used in particular for applications where small dosage quantities, for example of toxic substances, are dispensed with high precision into small receiving containers. In many cases such receiving containers are placed on a balance in order to weigh the substance that is discharged from the dosage-dispensing device, so that the substance can subsequently be processed further in accordance with given specifications.

A dosage-dispensing device which is described in EP 0 527 976 B1 has a housing with a receptacle for dosage material and a dispensing head which consists of an elastic material. The dispensing head, shaped like a baby bottle nipple, has a slit-shaped orifice which can be opened from the outside by applying a lateral force or pressure from two diametrically opposite directions. To prevent the formation of particle bridges during the dispensing of dosage material, such particle bridges can be broken up by a needle-shaped actuator.

The dosage-dispensing device disclosed in EP 0 527 976 B1 has the disadvantage that it is suitable only for dosage materials with good free-flow properties such as liquids, granulates, or special powders with particles that are approximately spherical and have a smooth surface. As soon as other kinds of powders are to be dispensed which are sticky or whose particles have a tendency to interlock with each other due to their shapes, even an actuator will be of little use. As described in EP 0 527 976 B1 as a solution for these cases, the housing of the dosage-dispensing unit can likewise be made of an elastic polymer material, which can be squeezed together from the sides like the slit-shaped orifice. As a result of the lateral compression the dosage material is pushed out of the receptacle compartment and expelled from the opened orifice. With this mode of discharge, an overpressure is produced inside the receptacle compartment, particularly if the latter is not completely filled with material, as the air in the receptacle compartment is being compressed. As soon as the outlet is opened, the compressed air pushes the dosage material through the outlet orifice. With very fine powdery dosage material this can have the consequence that the discharged particles are spread over a wide area instead of arriving in the receiving container. Besides the additional cleaning effort, this creates the danger in the case of toxic dosage material that the environment of the dosage dispensing device is being contaminated. Furthermore, with the material behaving in this way it can be difficult to achieve very precise deliveries of dosages in the milligram- or microgram range, as the loss rate due to the scattered material is largely random. Furthermore, the lateral compression of the housing can also have the effect that the dosage material is only being compacted instead of being delivered out of the dosage-dispensing device.

It is therefore the object of the present invention to create a dosage-dispensing device which has a dispensing head consisting of an elastic material and which allows the dosage material to be delivered in a precise and contamination-proof manner that is not affected by the flow properties of the dosage material.

SUMMARY OF THE INVENTION

This objective is met by a dosage-dispensing device in accordance with the claims. The dosage-dispensing device which can be used for dosage materials in the form of powders or pastes, includes a housing with at least one receptacle compartment formed inside the housing for the purpose of holding the dosage material. The dosage-dispensing device further includes at least one dispensing head that comprises an elastic material and has an outlet for the dosage material. In the non-stressed condition, i.e. when there is no mechanical force or pressure acting on it, the outlet is tightly closed against the outside. When a force or pressure is applied, the outlet opens up, with the aperture width being variable, dependent on the applied force. Furthermore, inside the receptacle compartment and/or the dispensing head, there is at least one mechanical actuator element arranged which is capable of linear movement relative to the housing, along the lengthwise axis of the latter. With the at least one mechanical actuator element, a thrust can be generated which is directed at least from the direction of the receptacle compartment towards the outlet and is acting on the outlet or on the dispensing head. With the thrust that can be generated by means of the at least one actuator element, the outlet can be opened.

Furthermore there is at least one mechanical conveyor means arranged in the receptacle compartment and/or in the dispensing head. This conveyor means serves to advance the dosage material towards the outlet. This has the advantage that dosage material is always being moved in sufficient quantity into the path to the outlet and that the formation of particle bridges in the receptacle compartment and/or the dispensing head is prevented. The term "particle bridge" is generally known and refers to the behavior of particulate bulk materials in silo containers whose outlet is arranged in the bottom part. During an outflow of material in the vicinity of the bottom, individual particles can become jammed up against each other and form bridges inside the silo, so that no more material can flow to the outlet.

The dosage-dispensing device is thus distinguished by the fact that the outlet can be opened from the inside with the help of the at least one actuator element. The term "inside" in the present context always refers to the interior of the dosage-dispensing device, in particular the receptacle compartment which is delimited by the housing and the dispensing head. As the dispensing head comprises elastic material, no further openings, slits, gaps, seams, joints or the like are necessary besides the outlet.

Further developed embodiments of the dosage-dispensing device are defined in the dependent claims.

The outlet is formed preferably in the elastic material of the dispensing head. This elastic material can consist of a single kind of material or also of different materials, so-called composite materials. These composite materials can for example take the form of polymers with filler materials, or even the form of layered materials comprised of polymer and metal layers. Furthermore, different polymer materials that differ from each other in their hardness can likewise be combined with each other into composite materials. The elastic material can also have portions of different material thickness. With composite materials and by making use of the design possibilities in regard to the material thickness, a dispensing head can be optimally matched to the properties of the dosage material and to the dosage-dispensing device.

By choosing an appropriate design for the actuator element and the elastic dispensing head, one can also achieve a mechanical coupling between the two elements. The mechanical coupling of the two elements allows a positive control of the outlet aperture dependent on a linear displacement of the actuator element. Due to this positive control, the outlet aperture of the outlet orifice and, consequently, the delivery rate of the dosage material can be controlled very accurately. A mechanical coupling can be achieved for example with an arrangement where the actuator element includes a coupler ring which is at least partially embraced by parts that are formed on the dispensing head, for example stiffener ribs, struts, projections, bulges and the like.

The coupler ring itself can be designed in various configurations which promote the passing of the dosage material through the outlet. For example, the coupler ring may have a sawtooth-like or wave-shaped profile. If the coupler ring is arranged with the ability to rotate relative to the dispensing head, the profile of the coupler ring is being tracked through sliding engagement for example by ridges of the dispensing head as soon as the coupler ring and the ridges enter into contact with each other. This concept allows oscillating movements to be generated in the dispensing head in the vicinity of the outlet.

The outlet of the dispensing head which, as mentioned above, opens itself in response to a force- and/or pressure of the actuator element is configured advantageously in the form of one or more slits which in the absence of a force remain closed and which open themselves when a force or pressure is applied.

As an example, there can be several slits originating from a central point of intersection in a radiating or star-shaped pattern.

The at least one mechanical conveyor means can include for example at least one rotor and a stator, wherein the stator is fixedly connected to an interior wall of the receptacle compartment and/or the dispensing head and the at least one rotor is arranged so that in relation to the stator it can turn about its rotary axis.

In a further embodiment of the dosage-dispensing device the mechanical conveyor means includes an inner rotor and, coaxial to the latter, an outer rotor turning preferably in the opposite direction, and in some cases also a stator.

In the aforementioned embodiments where the mechanical conveyor means includes a rotor, or an inner and an outer rotor, the one rotor or the inner and/or outer rotor can comprise a conveyor screw, or at least individual sections can be configured as conveyor screws or equipped with conveyor blades. A conveyor screw is also often referred to as helix conveyor or Archimedean screw.

The rotary axis of the rotor, or of the inner and/or outer rotor, is arranged preferably along the central longitudinal axis of the dispensing head and/or of the receptacle compartment. If the at least one mechanical actuator element is part of the at least one conveyor means, the central longitudinal axis of the mechanical actuator element is preferably arranged likewise along the central longitudinal axis of the dispensing head and/or of the receptacle compartment.

In performing its function of advancing the dosage material from the receptacle compartment and/or the dispensing head towards the outlet, the mechanical conveyor means can be further helped by an arrangement where the rotor, or the inner and/or outer rotor, is slidable in a linear movement along its rotary axis.

If the rotor has for example the shape of a conveyor screw which turns in a cylindrical receptacle space with a smooth internal wall surface, there will be a tendency for sticky or pasty dosage material to accumulate in and adhere to the helix screw, to turn together with the latter and thus not to be moved forward to the outlet. The stator which was mentioned above has the purpose of counteracting this tendency and includes elements that are appropriate to perform this task, which are arranged in fixed connection or a fixed spatial relationship to the internal wall surface. The stator can for example have at least one lamellar vane and/or at least one projection. The term "lamellar vane" refers for example to lamellae that were left standing between grooves, and also to ribs, guide vanes and connecting struts. The term "projections" includes convexities of all kinds, for example tetrahedral projections or the nubs of knurled surfaces. The lamellar vanes, projections or nubs can be made of rigid materials as well as elastic materials. Of course, the vanes, projections or nubs can also be arranged so that they are movable in relation to the inside wall, so that when the rotor is turning in one direction the projections will lie smoothly against the inside wall, and with the opposite sense of rotation they will stand up.

In one embodiment of the dosage-dispensing device the at least one lamellar vane runs over its lengthwise extension in a straight line and parallel to the central longitudinal axis of the dispensing head and/or the receptacle compartment.

In another embodiment, the at least one lamellar vane is configured to resemble an internal screw thread, spiraling about the central longitudinal axis of the dispensing head and/or the receptacle compartment.

As described hereinabove, the actuator element is arranged so that it can slide in linear movement along its central longitudinal axis (A). There can further be an additional closure spring acting on the actuator element in the closing direction of the outlet. The closure spring can assist the elastic self-closing behavior of the dispensing head if the dispensing head and the actuator element are coupled to each other. Furthermore, the closure spring provides a higher safety margin against inadvertent opening of the outlet.

Finally, it should be mentioned that the rotation as well as (if applicable) the linear movement of the rotor, or of the inner and/or outer rotor, can take place with a uniform direction or also with alternating direction. In embodiments with an inner and an outer rotor there is further the possibility that one of the two rotors is set at rest and thus performs the function of the stator or of an additional stator. Furthermore, one could also impart to the rotor an oscillation that is superimposed on the rotary movement and/or the linear movement. This provides a way to avoid or at least impede the adhesion of dosage material to the rotor and the stator. In addition this also allows the lips of the outlet orifice to be set into oscillation. This is likewise the case if the actuator element is subjected to an oscillatory movement in the direction of the central longitudinal axis. It is also possible for the actuator element and the conveyor element to operate in such a way that their effects cancel each other. For example in the case of a very easy-flowing dosage material it is conceivable that even though the conveyor means is operative, the outlet is slowly being closed by means of the actuator element towards the end of the dispensing process.

BRIEF DESCRIPTION OF THE DRAWINGS

The dosage-dispensing device will be described hereinafter in more detail through examples and with references to the drawings, all of which are in a three-dimensional format and wherein.

DETAILED DESCRIPTION

Figure 1:
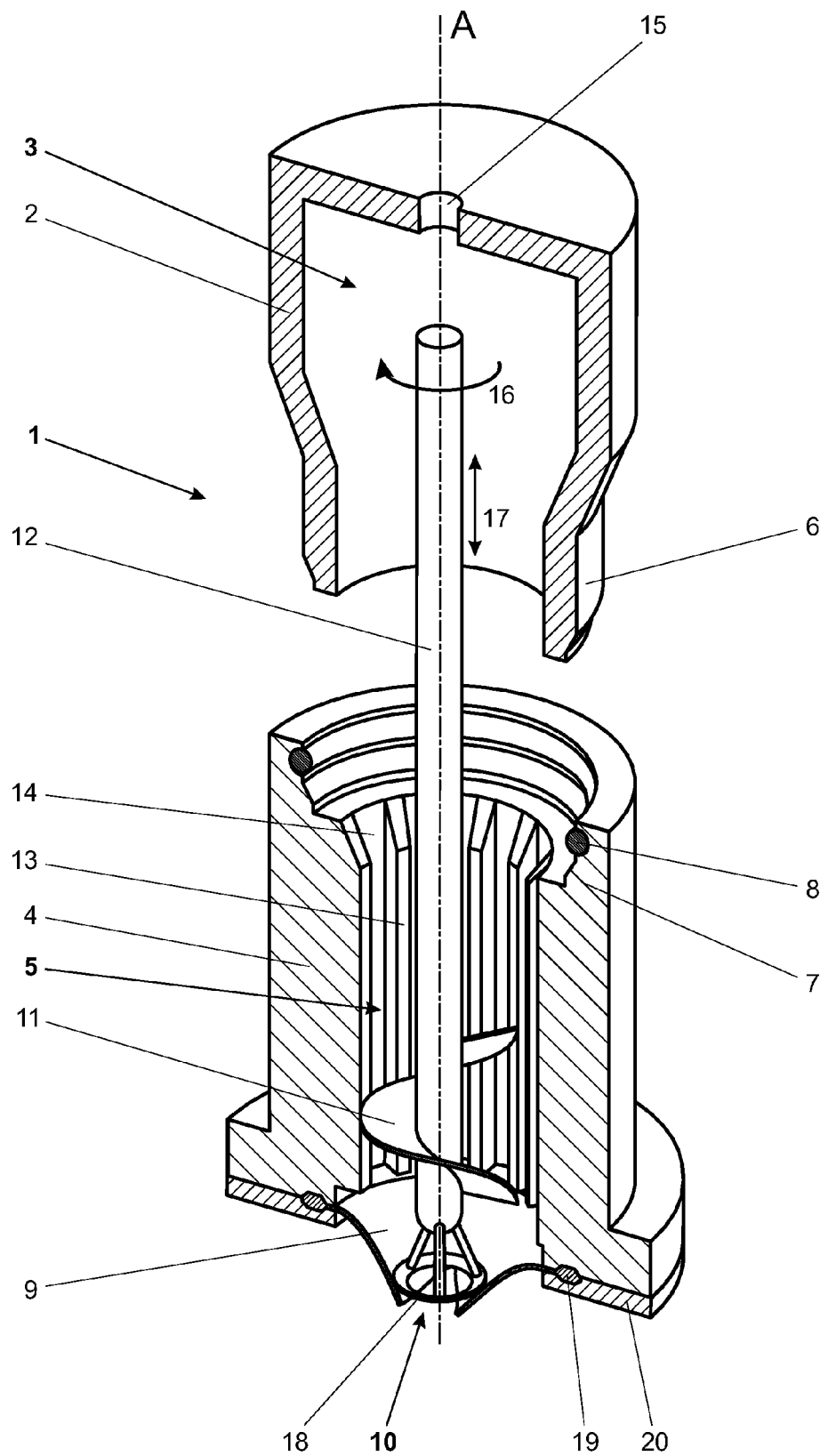
FIG. 1 shows a dosage-dispensing device in a sectional view, with a housing, a dispensing head in the form of a membrane, a mechanical conveyor means, and a mechanical actuator element.

The dosage-dispending device 1 shown in FIG. 1 has a two-part housing consisting of a housing top section 2 and a housing bottom section 4 which enclose, respectively, two parts 3, 5 of a receptacle compartment which serves to hold a dosage material. To allow the top section 2 and the bottom section 4 of the housing to be connected to each other, they are equipped, respectively, with connecting portions 6 and 7, wherein a seal 8 is arranged between the connecting portions 6 and 7. At the underside of the housing bottom section 4, a dispensing head 9 consisting of an elastic material and having a slit-shaped outlet 10 (shown here in the open state) is attached with a tightly sealed connection. In the present context, expressions such as "top section" and "bottom section" always refer to the position of the parts in relation to the direction of gravity.

As FIG. 1 shows, the dispensing head 9 is configured as a plane elastic membrane which has along its perimeter a ring-shaped bulge 19. This ring-shaped bulge is held captive with a snug fit in a ring-shaped groove which is formed between the housing bottom section 5 and a holder ring 20. This serves to prevent the membrane-shaped dispensing head 9 from being torn loose from its anchoring hold under stress. Furthermore, this design allows the membrane-shaped dispensing head 9 to be set under a certain amount of tension, so that the slit-shaped outlet 10 does not already open up under the smallest amount of force, for example when filling the bottom part 5 of the receptacle compartment.

The dosage-dispensing device 1 includes a mechanical conveyor means with a rotor and a stator. In the illustrated example, the rotor is a conveyor helix with a spiraling conveyor blade 11 which is rotationally tied to a rotor shaft 12. The stator has a fixed connection to the housing bottom section 4. The stator is in essence composed of lamellar longitudinal ribs 13 which are arranged parallel to each other and to the rotor shaft 12. The rotor is guided inside the housing with rotational and axial mobility, as the rotor shaft 12 is constrained by the bearing 15 in the top section 2 of the housing as well as by the sliding contact between the outer edge of the spiraling conveyor blade 11 and the lamellar-shaped longitudinal ribs 13 in the bottom section 4 of the housing. The circular arrow 16 at the upper end of the rotor shaft 12 indicates the direction in which the rotor turns during operation of the dosage-dispensing device 1, whereby a downward-directed conveyor action is generated in a dosage material that surrounds the spiraling conveyor blade 11. The delivery rate can be controlled by varying the rate of rotation of the rotor, and the dispensing process is ended by stopping the rotor. As the rotor shaft 12 can also be moved up and down along its central longitudinal axis A as indicated by the double arrow 17, it is also possible, similar to the action of a piston, to expel dosage material from the outlet 10 when the rotor shaft 12 is not turning, if the latter is pushed towards the outlet 10. In connection with a suitable drive mechanism (not shown in the drawing) this vertical mobility can also be used to superimpose a vertical vibrating- or shaking movement on the circular movement of the rotor, which serves to loosen the dosage material and to counteract the clogging of the conveyor means with pulpy dosage material.

Further, a mechanical actuator element 16 is connected to the rotor shaft 12 in the vicinity of the dispensing head 9. In order to open the outlet, this mechanical actuator element 18 is pushed in a linear motion along its central longitudinal axis in the direction towards the outlet. As soon as the dispensing head 9 and the actuator element 18 touch each other, the opening of the outlet 10 can begin. To close the outlet 10, the actuator element 18 is pushed in a linear motion away from the outlet 10.

When stopping the dispensing process, in order to immediately remove pressure from the outlet, whereby the latter instantly shuts itself off, the preferred mode of stopping is to either retract the actuator element 18 and turn the rotor shaft 12 in the opposite direction and/or to slide the rotor shaft 12 in a linear movement away from the outlet 10.

Figure 2A:
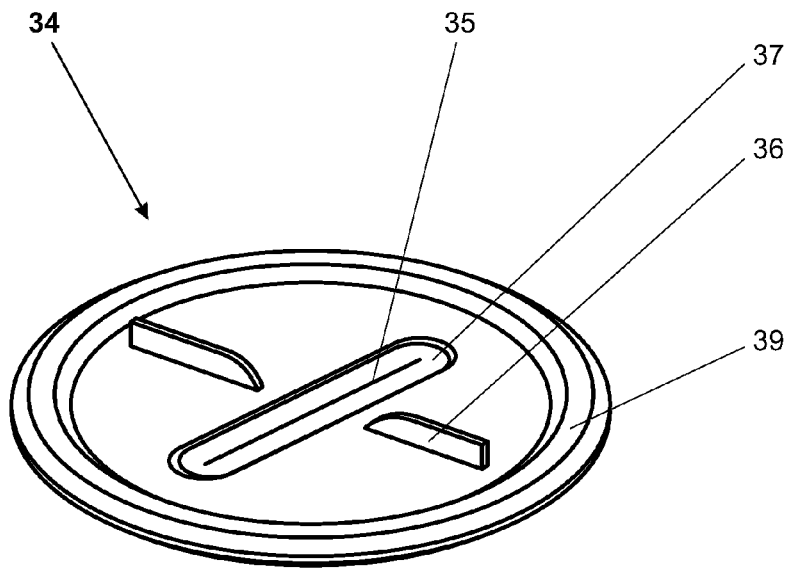
FIG. 2a shows a first embodiment of a membrane-shaped dispensing head with an outlet in the form of a slit and with two stiffener ribs.

In FIG. 2a a first embodiment of a membrane-shaped dispensing head 34 is illustrated with a slit-shaped outlet 35 and with two stiffener ribs 36. As mentioned already in the description of FIG. 1, the flat area of the membrane-shaped dispensing head 34 is delimited by a ring-shaped bulge 19. The stiffener ribs 36 serve on the one hand to make the membrane-shaped dispensing head 34 more rigid in the vicinity of the outlet, so that an inadvertent opening of the outlet 35 can be avoided. On the other hand, the stiffener ribs 36 can also serve as defined contact locations for the mechanical actuator element which is shown in FIG. 1. The stiffener ribs 36 can be formed integrally on the dispensing head 34. Alternatively, they could also consist of one or more different, for example less elastic, materials and be connected to the dispensing head 34. Furthermore, the membrane-shaped dispensing head 34 can also have variations in its material thickness, as indicated by the depressed area 37. In addition, as mentioned previously herein, the dispensing head 34 can also consist of composite materials.

Figure 2B:
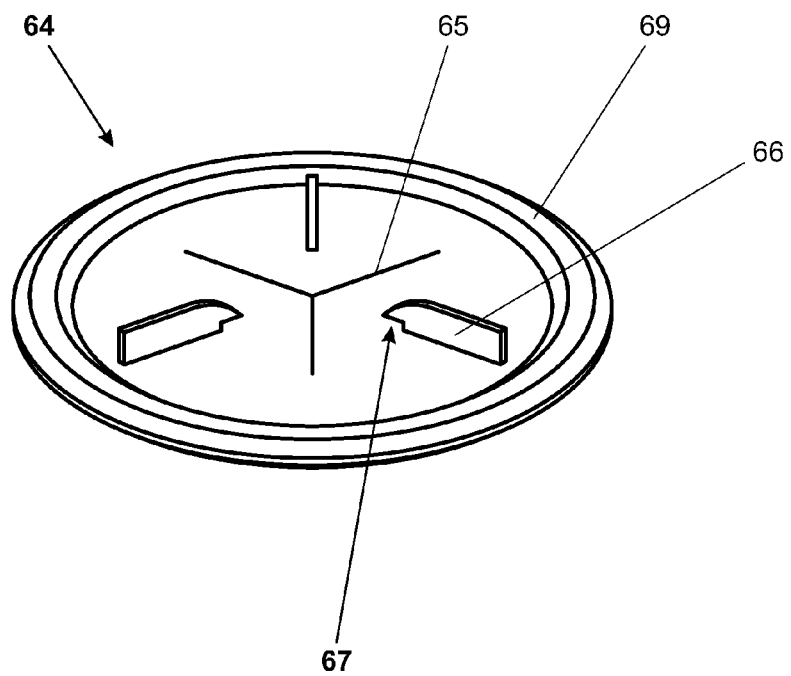
FIG. 2b shows a second embodiment of a membrane-shaped dispensing head with a star-shaped outlet and with three stiffener ribs.
Figure 3:
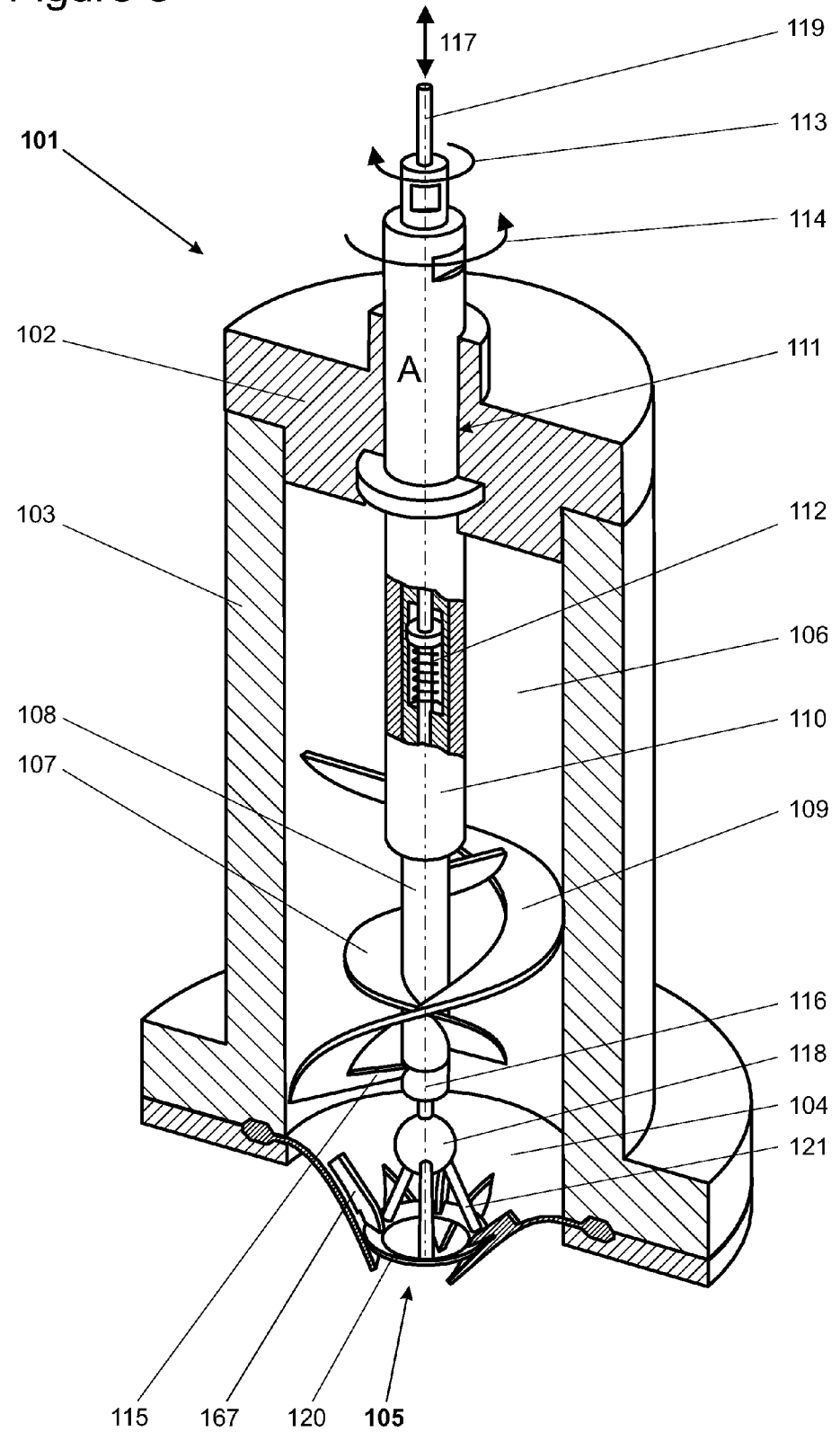
FIG. 3 represents a further embodiment of a dosage-dispensing device in a sectional view, with an inner rotor and an outer rotor, and with an outlet which is positively controlled by the mechanical actuator element.

In comparison to the embodiment that has just been described, the embodiment of a membrane-shaped dispensing head 64 as shown in FIG. 2b is distinguished only by the fact that it has an outlet 65 which, instead of a single slit, is formed of three slits in a star-shaped arrangement. The ring-shaped bulge 69 corresponds to the ring-shaped bulge in the preceding embodiment. Furthermore, the star-shaped outlet 65 is stiffened by three stiffener ribs 66. Each of the ribs 66 has an undercut 67, which serves to couple the dispensing head 64 to the mechanical actuator element (which is illustrated in FIG. 3) by way of a form-fitting connection. This provides a way to positively control the outlet 65 by means of the actuator element.

The purpose of the example of FIG. 2b is to illustrate that the configuration of the outlet orifice is not limited to a single slit-shaped outlet, but that any number of slits are possible. Of course, the ring-shaped bulge 69 can be designed to have any desired height in the direction perpendicular to the flat area of the dispensing head 64, whereby cup-shaped dispensing heads 64 are formed which can likewise be used in the dosage-dispensing device according to the invention.

The dispensing head can be made of any of the state-of-the-art materials such as for example soft polyvinyl chloride (PVC), polypropylene (PP), polyethylene (PE), silicone, as well as synthetic or natural rubber. Moreover, there are further materials which can be used for the membrane-shaped dispensing head, but which would be unsuitable for example for the type of dispensing head disclosed in EP 0 527 976 B1. For example, a membrane-shaped dispensing head made of polytetrafluoro-ethylene (PTFE), hard polyethylene, polyoxymethylene (POM), or even of very thin metal could also be used.

In FIG. 3 a dosage-dispensing device 101 is shown which has an inner rotor and an outer rotor. As can be seen, the device includes a housing top section 102, a housing bottom section 103, as well as a dispensing head 104, which together enclose a receptacle compartment 106 for the dosage material. The dispensing head 104, whose star-shaped outlet 105 is shown in the open state, corresponds in its design essentially to the dispensing head represented in FIG. 2b.

The inner rotor is a conveyor helix with an auger-shaped conveyor blade 107 which is solidly connected to the inner rotor shaft 108. The outer rotor has an auger-shaped conveyor blade 109 which is solidly connected to the outer rotor shaft 110. The outer rotor shaft 110 is configured as a hollow shaft which is rotatably supported in a bearing 111 in the housing top section 102. The inner rotor shaft 108 is rotatably supported inside the tube-shaped outer rotor shaft 110. In the arrangement of FIG. 3, the conveyor blade 107 is shown as a left-handed screw and the conveyor blade 109 as a right-handed screw, which means that the conveyor blades 107 and 109 have oppositely oriented screw threads. To perform their conveyor function, they are therefore driven so that they turn against each other, as indicated by the circular arrows 113 and 114 at the upper end of the rotor shafts 108 and 110. The conveyor blade 109 of the outer rotor has at its lower end an extension 115 projecting inward towards the inner rotor shaft 108 and connected to a bearing 116 which is rotatably supported on the inner rotor shaft 108.

The inner rotor shaft 108, too, is configured as a hollow shaft in whose interior an actuator rod 119 is guided in linear sliding movement. A mechanical actuator element 118 is arranged at the lower end of the actuator rod 119. A coupler ring 120 of the actuator element 118 is engaged in the undercuts of the stiffener ribs 167 which have been described in FIG. 2b, so that the dispensing head 104 is mechanically coupled to the actuator element 118. If the stiffener ribs 167 are made of an inelastic material, it is clear that at least the actuator element 118 cannot turn together with the inner rotor 108, as this would cause the destruction of the dispensing head 104 or at least of the stiffener ribs 167. However, if the stiffener ribs 167 are made of an elastic material, this opens the possibility to generate oscillating movements in the area of the outlet 105 through a rotation of the actuator element 118, specifically through the interaction between the supporting struts 121 and the stiffener ribs 167. With the ability to impart a linear sliding movement to the actuator rod 119 as indicated by the double arrow 117 and with the actuator element 118 being coupled to the dispensing head 104, the opening and closing of the outlet 105 can be positively controlled.

However, the coupler ring 120 and the stiffener ribs 167 can also be configured in such a way that a relative rotation can take place between the actuator element 118 and the dispensing head 104 without a mechanical action of the struts 121 against the stiffener ribs 167. The coupler ring 120 itself can be designed in different ways so as to promote the passage of the dosage material though the outlet 105. The coupler ring 120 can for example have a sawtooth-shaped or wave-shaped profile. If the coupler ring 120 is arranged with the freedom to rotate relative to the dispensing head 104, the profile of the coupler ring 120 can for example be in sliding contact with the stiffener ribs, whereby also oscillatory movements of the dispensing head 104 can be generated in the area of the outlet 105. In this arrangement, it is not necessarily required that the individual sectors of the star-shaped outlet 105 move synchronously in the same direction.

As is evident in the cutaway view of the outer rotor shaft 110 and the inner rotor shaft 108, a closure spring 112 can be arranged between the actuator rod 119 and the inner rotor shaft 108 in such a way that the closure spring 112 exerts a force on the actuator rod 119 which urges the latter in the closing direction of the outlet 105. The closure spring 112 serves to reinforce the self-closing elastic behavior of the dispensing head 104. Furthermore, by means of the closure spring 112 a higher safety margin can be achieved against inadvertent opening of the outlet 105.

Figure 4:
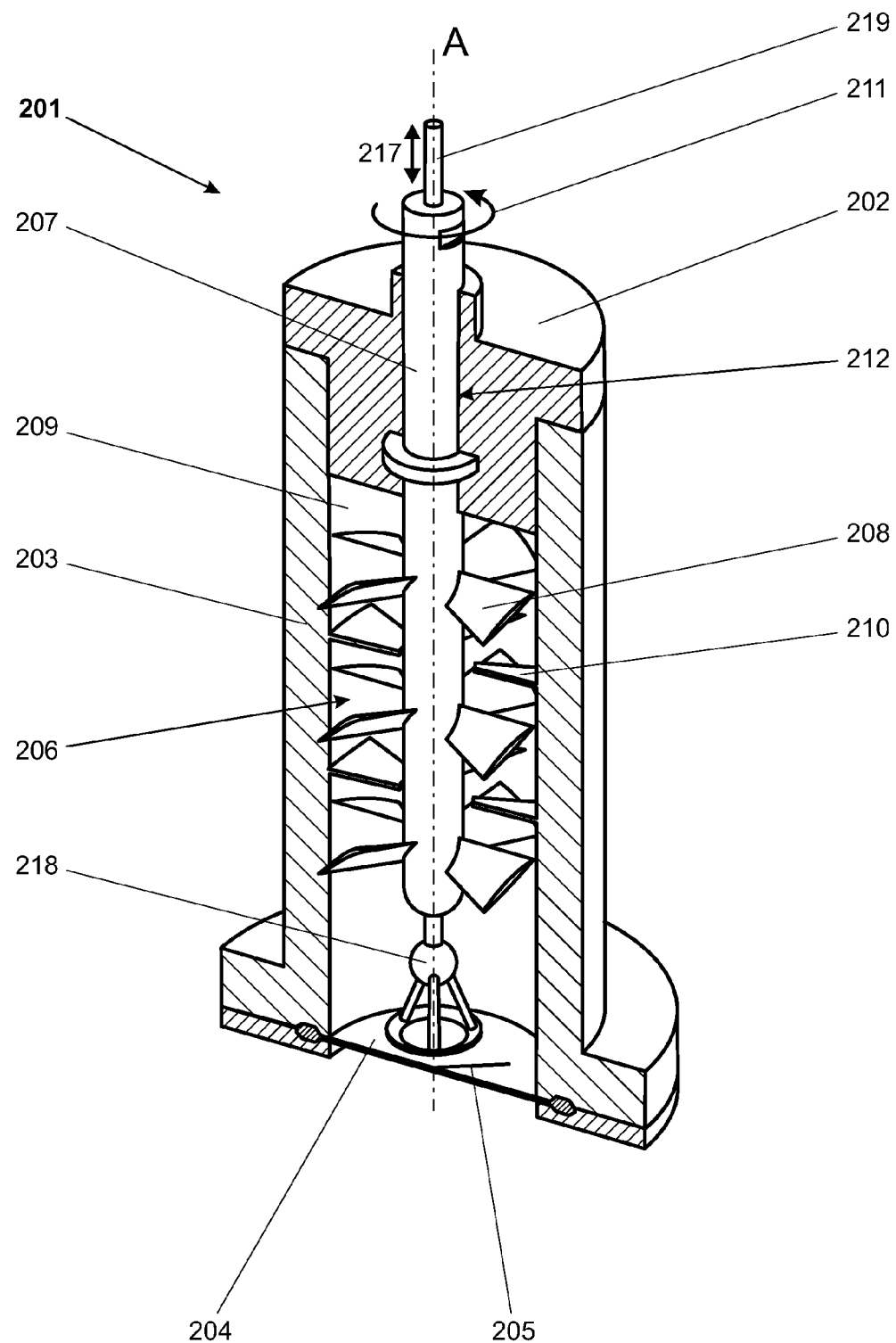
FIG. 4 represents a third embodiment of a dosage-dispensing device in a sectional view, with a further design of the mechanical conveyor means and with a mechanical actuator means.

FIG. 4 shows a dosage-dispensing device 201 with a rotor and a stator. The housing of the dosage-dispensing device 201 comprises a housing top section 202 and a housing bottom section 203 as well as a dispensing head 204 with a slit-shaped outlet 205, which together enclose a receptacle compartment 206 for the dosage material.

The rotor, consisting of a rotor shaft 207 with conveyor blades 208, which in their shape and arrangement are comparable to rings of turbine blades, is guided in rotary movement in the housing and simultaneously constrained in the axial direction due to the way in which the rotor shaft 207 is held in the bearing 212 of the housing top section 202. The stator consists in this case of the housing bottom section 203 which at its inside wall 209 carries radially inward directed guide vanes 210 which are likewise arranged in a configuration of several rings in such a way that each ring of guide vanes 210 reaches into the space between two rings of conveyor blades 208. Thus, when the rotor is turning, the conveyor blades 208 comb through the interstitial spaces between the guide vanes 210 of the stator. With the rotor turning in the appropriate direction, the result of the slanted position of the conveyor blades 208 and the guide vanes 210 is again a downward-directed conveyor effect. The circular arrow 211 at the upper end of the rotor shaft 207 indicates the direction in which the rotor turns during operation of the dosage-dispensing device 201, whereby the dosage material in the receptacle compartment 206 is subjected to a downward-directed conveyor action.

The rotor shaft 207 in the embodiment of FIG. 4 is likewise configured as a hollow shaft in whose interior an actuator rod 219 is guided in linear sliding motion. A mechanical actuator element 218 is arranged at the lower end of the actuator rod 219. The capability of linear sliding movement of the actuator rod 219 which is indicated by the double arrow 217 serves to vary the aperture width of the outlet 105. Furthermore, the discharge rate cannot only be controlled by way of the aperture width, but also by varying the rate of revolution of the rotor.

Although the invention has been described by presenting specific embodiments, it is obvious that many additional variations of embodiments could be created from a knowledge of the present invention, for example by combining the features of the individual examples of embodiments with each other and/or by interchanging individual functional units of these embodiments. For example, the dispensing head shown in FIGS. 2 and 3 could also be used in a dosage-dispensing device according to FIG. 4. Also within the scope of the invention, further configurations of the dispensing head are conceivable in regard to the arrangement of the slits and in regard to the use of different materials or material combinations, as well as different systems and solutions for coupling the mechanical actuator element to the dispensing head.

What is claimed is:

1. A dosage dispensing device, for dosage materials in the form of powders or pastes, comprising:
    a housing;
    a receptacle compartment formed inside the housing adapted to hold dosage material;
    a dispensing head, the dispensing head comprising an elastic material and including an outlet, the outlet closes tightly against the outside in the absence of mechanical force and opens to a variable aperture width when force is applied;
    a mechanical actuator element capable of linear movement along the lengthwise axis of the housing, the mechanical actuator element is arranged in at least one of a receptacle compartment and a dispensing head; the outlet opens when force generated by the mechanical actuator, substantially from the direction of the receptacle compartment, is directed toward the outlet; and
    a mechanical conveyor means arranged in at least one of the receptacle compartment and the dispensing head, the conveyor means operable to advance the dosage material towards the outlet.

2. The device of claim 1, wherein:
    the outlet is formed in the elastic material of the dispensing head.

3. The device of claim 2, wherein the elastic material is at least one of a composite material and portions of differing material thickness.

4. The device of claim 1, further comprising stiffener ribs in the dispensing head.

5. The device of claim 1, wherein the actuator element is coupled to the dispensing head; and
    linear displacement of the actuator element controls the aperture width of the outlet.

6. The device of claim 1, wherein the actuator element comprises:
    a coupler ring, the ring has a profile shape selected from the group including: sawtooth-like and wave-shaped; and wherein:
    the actuator element is positioned to rotate relative to the dispensing head; and
    the dispensing head is slidably engaged with the coupler ring such that during rotary movement of the coupler ring, the dispensing head follows the profile shape and undergoes oscillatory movement in the area of the outlet.

7. The device of claim 1, wherein the outlet has the shape of a slit in the absence of a mechanical force.

8. The device of claim 1, wherein the outlet comprises slits arranged in the shape of a star in the absence of a mechanical force.

9. The device of claim 1, wherein: the conveyor means comprises a rotor and a stator, the rotor is positioned to turn about an axis of rotation relative to the stator, the stator is solidly connected to at least one of an inside wall of the receptacle compartment and the dispensing head.

10. The device of claim 9, wherein the rotor comprises a conveyor screw.

11. The device of claim 9, wherein the rotor further comprises: an individual section configured as a conveyor screw or equipped with a conveyor blade.

12. The device of claim 1, wherein the conveyor means comprises:
    an inner rotor and an outer rotor, the rotors arranged coaxially relative to one another, and the direction of rotation of the outer rotor is opposed to the direction of rotation of the inner rotor.

13. The device of claim 12, wherein at least one of the inner rotor and the outer rotor comprise a conveyor screw.

14. The device of claim 12, wherein at least one of the inner rotor and the outer rotor further comprise: an individual section configured as conveyor screws or equipped with a conveyor blade.

15. The device of claim 9, wherein the stator further comprises: at least one of a lamellar vane and a projection.

16. The device of claim 9, wherein the rotor slides along a central longitudinal axis in linear movement.

17. The device of claim 16, wherein the stator further comprises: at least one of a lamellar vane and a projection.

18. The device of claim 17, wherein the lamellar vane runs parallel to the central longitudinal axis when in its lengthwise extension.

19. The device of claim 17, wherein the lamellar vane spirals like a screw thread about the central longitudinal axis of at least one of the dispensing head and the receptacle compartment.

* * * * *